United States Patent [19]

Henney et al.

[11] 3,956,193

[45] May 11, 1976

[54] CONDUCTIVITY OF SILICON NITRIDE

[75] Inventors: John William Henney, Abingdon; James William Samuel Jones, Blewbury, both of England

[73] Assignee: United Kingdom Atomic Energy Authority, United Kingdom

[22] Filed: June 12, 1975

[21] Appl. No.: 586,260

Related U.S. Application Data

[63] Continuation of Ser. No. 312,310, Dec. 5, 1972, abandoned.

[30] Foreign Application Priority Data

Dec. 16, 1971 United Kingdom............ 58381/71

[52] U.S. Cl.................................. 252/500; 423/349
[51] Int. Cl.²..................... H01B 1/00; C01B 33/02
[58] Field of Search................ 252/500; 106/44; 423/349, 345

[56] References Cited
UNITED STATES PATENTS

| | | | |
|---|---|---|---|
| 3,052,814 | 9/1962 | Edwards et al. | 252/516 X |
| 3,101,257 | 8/1963 | Hagen et al. | 423/349 |
| 3,175,918 | 3/1965 | McGahan et al. | 423/345 |
| 3,236,673 | 2/1966 | O'Connor et al. | 423/345 X |
| 3,275,415 | 9/1966 | Chang et al. | 423/345 |
| 3,389,022 | 6/1968 | Kravitz | 423/345 |
| 3,758,672 | 9/1973 | Lewis | 423/345 |

*Primary Examiner*—Benjamin R. Padgett
*Assistant Examiner*—R. E. Schafer
*Attorney, Agent, or Firm*—Larson, Taylor and Hinds

[57] ABSTRACT

An electrically conducting artefact is produced by heating a silicon nitride artefact to a temperature high enough to decompose part of the silicon nitride to silicon but not high enough to evaporate the silicon which is formed, the heating taking place either in an environment which is inert to silicon or in a carbon containing environment which reacts with the silicon formed to give silicon carbide. Such an artefact has electrical conductivity properties which may, for example, be retained after heating at about 600°C in air for several hours.

5 Claims, No Drawings

CONDUCTIVITY OF SILICON NITRIDE

This is a continuation, of application Ser. No. 312,310 filed Dec. 5, 1972, now abandoned.

This invention relates to a method of producing an electrically conducting artefact.

Silicon nitride has certain advantages as an engineering ceramic material. For example, it has high strength at elevated temperatures, it has a low coefficient of thermal expansion, it has low density, it can be machined when not fully sintered, and it suffers minimal shrinkage during sintering. It is desirable to improve the electrical conductivity of silicon nitride for certain of its applications, e.g., in its use as a resistance heater.

According to this invention, a method of producing an electrically conducting artefact comprises heating a silicon nitride artefact to a temperature high enough to decompose part of the silicon nitride to silicon but not high enough to evaporate the silicon which is formed, the heating taking place either in an environment which is inert to silicon or in a carbon containing environment which reacts with the silicon formed to give silicon carbide. We have found that this method produces an artefact having advantageous electrical conductivity properties, and that those properties may, for example, be retained after heating at about 600°C in air for several hours. We believe that the electrically conducting properties are caused by an electrically conducting network of silicon or of silicon carbide in the final artefact.

The temperature used in the present method is usually greater than 1200°C and is preferably in the range from 1350°C to 1550°C.

The amount of silicon or silicon carbide formed, and hence the electrical conductivity of the artefact produced, depends on a number of factors, among which are the chemical composition of the silicon nitride artefact, its physical properties such as its density, porosity and permeability, the time and temperature of the heating, and the environment of the heating. It is therefore possible to control, to some extent, the electrical conductivity of the artefact produced.

Microscopic examination of artefacts produced when the heating takes place in the environment which is inert to silicon has shown that silicon is formed mainly in the interior of the grains of the silicon nitride to give a continuous network near to the surfaces of the artefact. The silicon is thereby protected from oxidation. If any silicon is formed at a surface of the artefact, it may be protected from oxidation by nitriding to convert such silicon to silicon nitride.

The environment which is inert to silicon may, for example, be an atmosphere of argon or of helium or it may be vacuum. It is, however, important that both oxygen and nitrogen are absent.

The carbon-containing environment may, for example, contain carbon in the form of the element. In this case, the carbon may, for example, be painted onto the surface of the silicon nitride artefact before it is heated when silicon carbide forms mainly on the surface of the grains of the silicon nitride, as shown by microscopic examination. Alternatively, the carbon-containing environment may contain chemically combined carbon in a compound of carbon, which compound is decomposable to carbon at the temperature of the heating. Such a compound may, for example, be a sugar, a wax, or a hydrocarbon oil with which the silicon nitride artefact may, for example, be impregnated before it is heated.

The artefact produced by the present method following such impregnation contains an electrically conducting network of silicon carbide in the pores thereof. The compound may, however, be a gas such as methane. The carbon-containing environment must be non-oxidising. It may therefore contain, for example, non-oxidising gases such as argon or helium, when the heating preferably takes place at a temperature in the range from 1450°C to 1550°C and for a time in the range from 1 to 10 hours. Nitrogen may be used as the non-oxidising gas, when the heating preferably takes place at a temperature greater than 1500°C.

The following examples illustrate the present invention.

EXAMPLE 1

A silicon nitride artefact of about 97% purity in the form of a bar of dimensions 2.5 cm × 0.3 cm was placed in a crucible and heated in a furnace for 3 hours at 1450°C in vacuo. The artefact was taken from the oven and cooled and found to comprise a mixture of silicon nitride and silicon, containing 15 $^v$/o of silicon. The $^v$/o of the silicon was estimated from measurement of the intensity of X-ray diffraction. Microscopic examimantion showed that the silicon had formed a continuous network in the interior of the silicon nitride grains. The room temperature resistivity was found to be 50 ohm-cm, and this value was unaffected by use of the artefact as a resistance heater at about 600°C in air for several hours.

The maximum temperature at which the artefact produced can be used as a resistance heater is limited by the semiconducting properties of the silicon. In the case of the artefact produced in this example, the maximum temperature was about 800°C ± 100°C, above which the resistivity decreased rapidly.

EXAMPLE 2

A silicon nitride artefact, similar to the artefact used in Example 1, was placed in a crucible together with powdered carbon. The crucible was then heated in argon to 1450°C. The artefact produced was found to be a mixture of silicon nitride and silicon carbide containing 40 $^v$/o of silicon carbide. Microscopic examination showed that the silicon carbide had formed a continuous network.

The room temperature resistivity of the artefact produced was found to be about 100 ohm-cm.

Further examples (Examples 3 to 6 below) were carried out in a similar manner to Example 1 to illustrate how the bulk density of the silicon nitride artefact and the temperature of the heating influence the room temperature resistivity of the final artefact. The results are summarised in tabular form.

| Example | Bulk Density of Artefact (g/cc) | Conditions of heating | v/o of Product | Resistivity of Product (ohm-cm) |
|---------|---------------------------------|------------------------|----------------|----------------------------------|
| 3 | 2.4 | 2 hours 1450°C <$10^{-3}$ tor | 3 | 75 × $10^3$ |
| 4 | 2.2 | " | 9 | 3 × $10^3$ |
| 5 | 2.4 | 2 hours 1500°C <$10^{-3}$ tor | 6 | 1 × $10^3$ |
| 6 | 2.2 | " | 15 | 50 |

We claim:

1. A method of forming a shaped electrically conducting silicon nitride artefact, wherein the silicon nitride provides the bonding together of the artefact, and the electrical conductivity is provided by an electrically conducting phase of silicon, which method comprises heating a silicon nitride artefact to a temperature high enough to decompose part of the silicon nitride to silicon but not high enough to evaporate the silicon which is formed, the heating taking place in an environment which is inert to silicon thereby to form an electrically conducting phase of silicon dispersed in a matrix of the silicon nitride, said method further comprising nitriding any silicon formed on the surface of the artefact so as to convert such silicon to silicon nitride.

2. A method according to claim 1 wherein the temperature used in the heating step is in the range from 1350°C to 1550°C.

3. A method according to claim 1 wherein the heating step takes place in an environment which is inert to silicon and wherein the electrically conducting artefact contains not more than 15% by volume of silicon.

4. A shaped electrically conducting silicon nitride artefact, wherein the silicon nitride provides the bonding together of the artefact and wherein the electrical conductivity is provided by a sub-surface electrically conducting phase of silicon dispersed in a matrix of the silicon nitride.

5. An artefact according to claim 4 containing from 3% to 15% of silicon by volume.

* * * * *